United States Patent
Donnell

[11] 3,837,708
[45] Sept. 24, 1974

[54] QUICK-CONNECT WHEEL MOUNTING MEANS
[76] Inventor: Daniel C. Donnell, RFD, Malta, Ill. 60150
[22] Filed: Nov. 2, 1973
[21] Appl. No.: 412,327

[52] U.S. Cl. .................. 301/1, 301/36 R, 403/365
[51] Int. Cl. ............................................. B60b 11/00
[58] Field of Search ..... 301/1, 111, 112, 122, 36 R, 301/36 A, 38 R; 403/371, 365, 3, 4, 52

[56] References Cited
UNITED STATES PATENTS

| | | | |
|---|---|---|---|
| 2,507,093 | 5/1950 | Collings | 403/3 |
| 2,570,604 | 10/1951 | Siegerist | 403/371 |
| 2,676,849 | 4/1954 | Houck et al. | 301/1 |
| 3,454,305 | 7/1969 | Gilmour, Jr. | 301/36 R |
| 3,476,416 | 11/1969 | Gilmour, Jr. | 301/1 |

*Primary Examiner*—M. Henson Wood, Jr.
*Assistant Examiner*—Victor N. Sakran
*Attorney, Agent, or Firm*—Hofgren, Wegner, Allen, Stellman & McCord

[57] ABSTRACT

A quick-connect mechanism for removably mounting a wheel to an axle. The mechanism includes a hub portion and means for constricting the hub portion into secured association with the axle. The constrictible hub further defines a male attachment portion adapted to receive a female attachment portion of a wheel mount. The wheel mount may be threadedly secured to the hub. A lock is provided to prevent loosening of the wheel mount on the hub in use.

13 Claims, 5 Drawing Figures

PATENTED SEP 24 1974  3,837,708
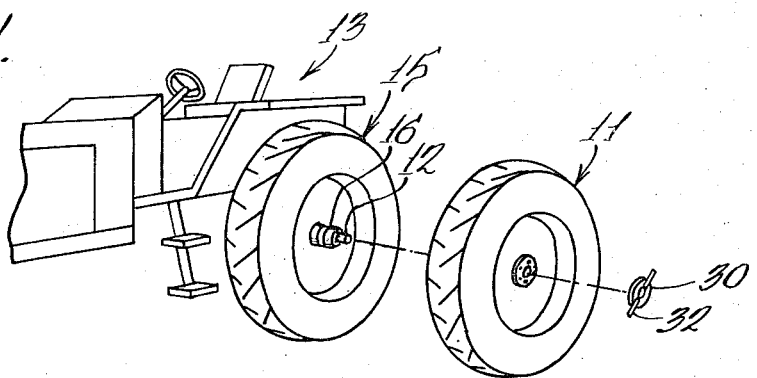
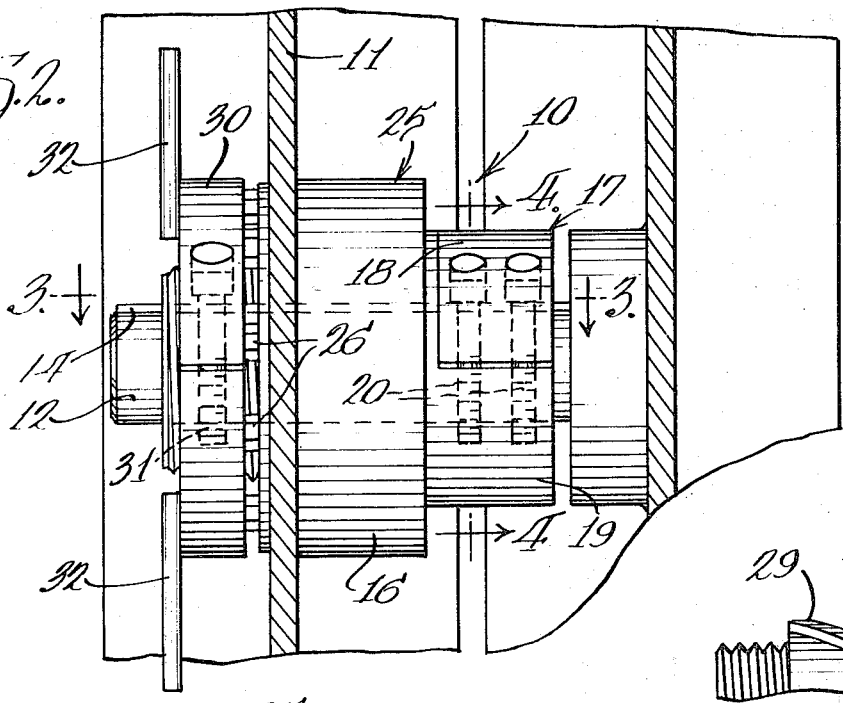

QUICK-CONNECT WHEEL MOUNTING MEANS

BACKGROUND OF THE INVENTION

1. Field of the Invention

This invention relates to connecting mechanisms, and in particular to quick-connect mechanisms for removably mounting a wheel to an axle.

2. Description of the Prior Art

In U.S. Letters Pat. No. 1,311,119 of J. D. Goldsmith, an emergency wheel is provided for an automobile having an auxiliary hub which threads onto the main axle to mount the emergency wheel outboard of the main wheel. The axle includes a threaded end to accept the auxiliary hub.

In J. A. Dann U.S. Letters Pat. No. 1,431,099, a threaded cap is provided for holding a central portion of a hub of an auxiliary wheel fixedly to the end of the axle while utilizing a radially outer rim structure for supporting the auxiliary wheel radially outwardly of the axle. The same general concept is shown in U.S. Letters Pat. Nos. 1,419,975 of S. H. Manchester and 3,068,049 of M. S. Smith.

In the J. Gilmour, Jr. U.S. Letters Pat. Nos. 3,454,305 and 3,476,416, axle mounts utilizing split hubs are disclosed. In each of these structures, the auxiliary wheel is bolted to the split hub in the conventional manner of bolting wheel mounts together in providing multiple wheel assemblies on an axle. The Gilmour, Jr. patents bring out the fact that the attachment of the wheels at a point adjacent the rims often places a considerable strain on the rim of both wheels presenting a serious safety problem.

SUMMARY OF THE INVENTION

The present invention comprehends an improved quickconnect mechanism for removably mounting a wheel to an axle including hub means defining a male connecting portion and a constrictible attachment portion, means for constricting the axle attachment portion to clamp the hub means to the axle, a wheel mount defining a female connecting portion, means for securing a wheel to the mount, and cooperating helical means on the male and female connecting portions providing retained association between the wheel mount and the hub means as an incident of the female portion being turned onto the male portion.

The mechanism may further include a second helical means on the hub axially outwardly of the male connecting portion and the lock means may include means cooperating with the second helical means for securing the lock means in loosening prevention association with the wheel mount.

In the illustrated embodiment, the wheel mount is threadedly secured to the hub with the locking means being threadedly secured thereto axially outwardly of the wheel mount.

Thus, the quick-connect mechanism comprises a combination of constrictible and threaded means providing an improved positive, readily effected wheel mount for use such as in mounting a second wheel on a tractor axle. The invention further comprehends the use of the wheel mounting mechanism as the sole wheel mounting means.

The quick-connect mechanism of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a fragmentary perspective view illustrating the mounting of a second wheel to a tractor axle by means of quick-connect mechanism embodying the invention;

FIG. 2 is a fragmentary enlarged section of the mechanism;

FIG. 3 is a section taken substantially along the line 3—3 of FIG. 2;

FIG. 4 is a vertical section taken substantially along the line 4—4 of FIG. 2; and FIG. 5 is a fragmentary elevation of a portion of modified wheel mounting mechanism embodying the invention.

DESCRIPTION OF THE PREFERRED EMBODIMENT

In the exemplary embodiment of the invention as disclosed in the drawing, a quick-connect mechanism generally designated 10 is provided for removably mounting a wheel 11 to an axle 12 of conventional construction. Thus, in the illustrated embodiment, axle 12 comprises an axle of a tractor 13 having a conventional longitudinal key 14. The quick-connect wheel mounting mechanism may be used to mount the sole wheel on the axle, or as illustrated in FIG. 1, may be utilized to mount a second wheel outboard of the normal wheel 15 provided on the axle so as to provide a dual mount wheel arrangement.

Wheel mounting mechanism 10 defines a quick-connect mechanism permitting rapid mounting and removal of the second wheel 11 as desired. The mechanism includes a hub 16 having a constrictible portion 17 which, as illustrated in FIG. 4, comprises two semi-annular portions 18 and 19 clamped about the axle 12 by means of suitable threaded securing elements, such as cap screws 20. As shown in FIG. 4, the element 18 may be provided with a keyway 21 for receiving the projecting portion of key 14 to lock the hub against axial rotation about the axle.

Hub 16 further includes a male connecting portion generally designated 22. Helical means 23 are provided on the male connecting portion 22, and as shown in FIG. 3, may comprise an outer threaded surface of the male connecting portion. A second threaded surface 24 is provided axially outwardly of surface 23, and in the illustrated embodiment, threaded surface portion 24 has a diameter less than the diameter of surface portion 23.

Hub 16 may be retained on axle 12 outwardly of the wheel 15, as shown in FIG. 1, to have quick-connected thereto the second wheel 11 to provide a dual mount arrangement in the tractor 13. Thus, to mount the second wheel 11, a female connecting portion 25 is secured to the wheel 11 by suitable threaded securing means, such as bolts 26 and spacers 27. Female connecting portion 25 defines an inner threaded surface 28 adapted to have threaded engagement with threaded surface 23 of male connecting portion 22 for threadedly securing the female connecting portion to the male connecting portion in the mounting of the second wheel 11 to the axle 12.

As shown in FIG. 5, the helical means may comprise a coarse thread means in the form of helical bars 29 to provide a threading means having a small lead angle, such as under 45°, to provide further facilitated quick mounting and removal of the wheel 11 when desired.

To prevent loosening of the femal connecting portion 25 from the male connecting portion 22 in use, a lock ring 30 may be secured to the threaded portion 24 axially outwardly of the female connecting portion to have abutment with the bolts 26, as shown in FIG. 3, thereby effectively precluding unthreading of the female connecting portion from the male connecting portion. As shown, the ring 30 may comprise a split ring provided with a cap screw 31 for constrictively locking the ring to the hub threaded surface 24. To facilitate threading of ring 30 onto hub threaded surface 24, the ring may be provided with a handle portion 32 comprising radially projecting lever portions.

Female connecting portion 25 may be retained on the wheel 11 so that to mount the wheel 11 on axle 12, the user merely threads the connecting portion 25 onto the hub connecting portion 22 on the axle. The lock ring may then be secured to the hub portion 24 to complete the installation. Threads 28 and 23 may be preselected to permit the installation of the wheel 11 on axle 12 by operation of the tractor drive further facilitating the installation. Thus, the user need merely start the threading of the female connecting portion 25 onto the thread 28 and then while locking the opposite wheel, drive the axle 12 and wheel 15 suitably to spin the wheel 11 onto the hub portion 22. If the tractor is to be driven only in a forward direction, the tractor is then immediately available for use with dual mount rear wheels as the normal operation of the tractor will prevent loosening of the wheel 11. To positively prevent any such loosening, however, the user may install the lock ring 30 as discussed above.

In the illustrated embodiment, the left wheel dual mount mechanism is provided with righthand threads, whereas the right wheel dual mount mechanism may have lefthand threads to provide the facilitated installation discussed above. Threads 23 and 28 illustratively may comprise quadruple threads. In one embodiment, threads 23 and 28 comprise 7½ inches diameter threads having a pitch of two threads per inch and a lead of 2 inches with the thread 24 comprising an American Standard thread having a 6½ inches diameter and a pitch of four threads per inch.

As will be obvious to those skilled in the art, the male and female connecting portions may be reversed in that the hub connecting portion 22 may comprise an annular portion having an internal thread 23 with the connecting portion 25 having an outer thread 28 to be received within the annular male connecting portion 22.

The provision of quick-connect mechanism 10 provides an improved facilitated switching between single and dual mount wheels in a tractor so that the user, such as a farmer, may quickly adapt the tractor for soil conditions at any given time. Alternatively, the mechanism 10 may be utilized as the sole wheel attaching means on the axle. Thus, illustratively, mechanism 10 may be utilized for providing facilitated changing of single wheels on the vehicle, such as in changing from ordinary tires to snow tire use.

The mechanism is extremely rugged and substantially service-free while yet being extremely simple and economical of construction.

The foregoing disclosure of specific embodiments is illustrative of the board inventive concepts comprehended by the invention.

I claim:

1. Quick-connect mechanism for removably mounting a wheel to an axle, comprising:
   cooperating hub means defining a male connecting portion and a constrictible axle attachment portion;
   means for constricting said axle attachment portion to clamp said hub means to said axle;
   a wheel mount defining a female connecting portion;
   means for securing a wheel to said mount; and
   cooperating helical means on said male and female connecting portions providing retained association between said wheel mount and said hub means as an incident of said female portion being turned onto said male portion.

2. The quick-connect mechanism for removably mounting a wheel to an axle of claim 1 wherein said constrictible axle attachment portion comprises mating semiannular portions.

3. The quick-connect mechanism for removably mounting a wheel to an axle of claim 1 wherein said constrictible axle attachment portion comprises mating semiannular portions and said constricting means comprises bolt means for clamping said semiannular portion about said axle.

4. The quick-connect mechanism for removably mounting a wheel to an axle of claim 1 wherein said helical means comprises a threaded outer surface portion of said male connecting portion and a complementary threaded inner surface portion of said female connecting portion.

5. The quick-connect mechanism for removably mounting a wheel to an axle of claim 1 wherein said helical means has a lead angle substantially less than 45°.

6. The quick-connect mechanism for removably mounting a wheel to an axle of claim 1 further including cooperating shoulder means on the axle and hub means for preventing relative coaxial rotation therebetween.

7. Quick-connecting mechanism for removably mounting a wheel to an axle, comprising:
   cooperating hub means defining a male connecting portion and a constrictible axle attachment portion;
   means for constricting said axle attachment portion to clamp said hub means to said axle;
   a wheel mount defining a female connecting portion;
   means for securing a wheel to said mount;
   cooperating helical means on said male and female connecting portions providing retained association between said wheel mount and said hub means as an incident of said female portion being turned onto said male portion; and
   lock means for preventing loosening of said association of said wheel mount and hub means.

8. The quick-connect mechanism for removably mounting a wheel to an axle of claim 7 wherein said hub includes second helical means axially outwardly of said male connecting portion and said lock means includes means cooeprating with said second helical means for securing the lock means in loosening prevention association with said wheel mount.

9. The quick-connect mechanism for removably mounting a wheel to an axle of claim 7 wherein said lock means includes manually operable handle means for selectively manipulating the lock means.

10. The quick-connect mechanism for removably mounting a wheel to an axle of claim 7 wherein said lock means is mounted to said hub means.

11. The quick-connect mechanism for removably mounting a wheel to an axle of claim 7 wherein said lock means is mounted to said hub means axially outwardly of said wheel mount.

12. The quick-connect mechanism for removably mounting a wheel to an axle of claim 7 wherein said axle comprises a vehicle axle having a first wheel secured thereto, said mechanism being secured to said axle outwardly of said wheel to provide a second wheel on said axle adjacent said first wheel.

13. The quick-connect mechanism for removably mounting a wheel to an axle of claim 7 wherein said hub further defines an axially outer portion having a threaded radially outer surface having a diameter smaller than the diameter of said male connecting portion, said lock means being threaded to said threaded outer surface.

* * * * *